Oct. 15, 1929. H. H. WATERMAN Re. 17,462

AIR SWEPT BALL MILL

Original Filed Nov. 25, 1924 2 Sheets-Sheet 1

INVENTOR HARRY H. WATERMAN

Chas. K. Davis

Attorney

Oct. 15, 1929. H. H. WATERMAN Re. 17,462
AIR SWEPT BALL MILL
Original Filed Nov. 25, 1924 2 Sheets-Sheet 2
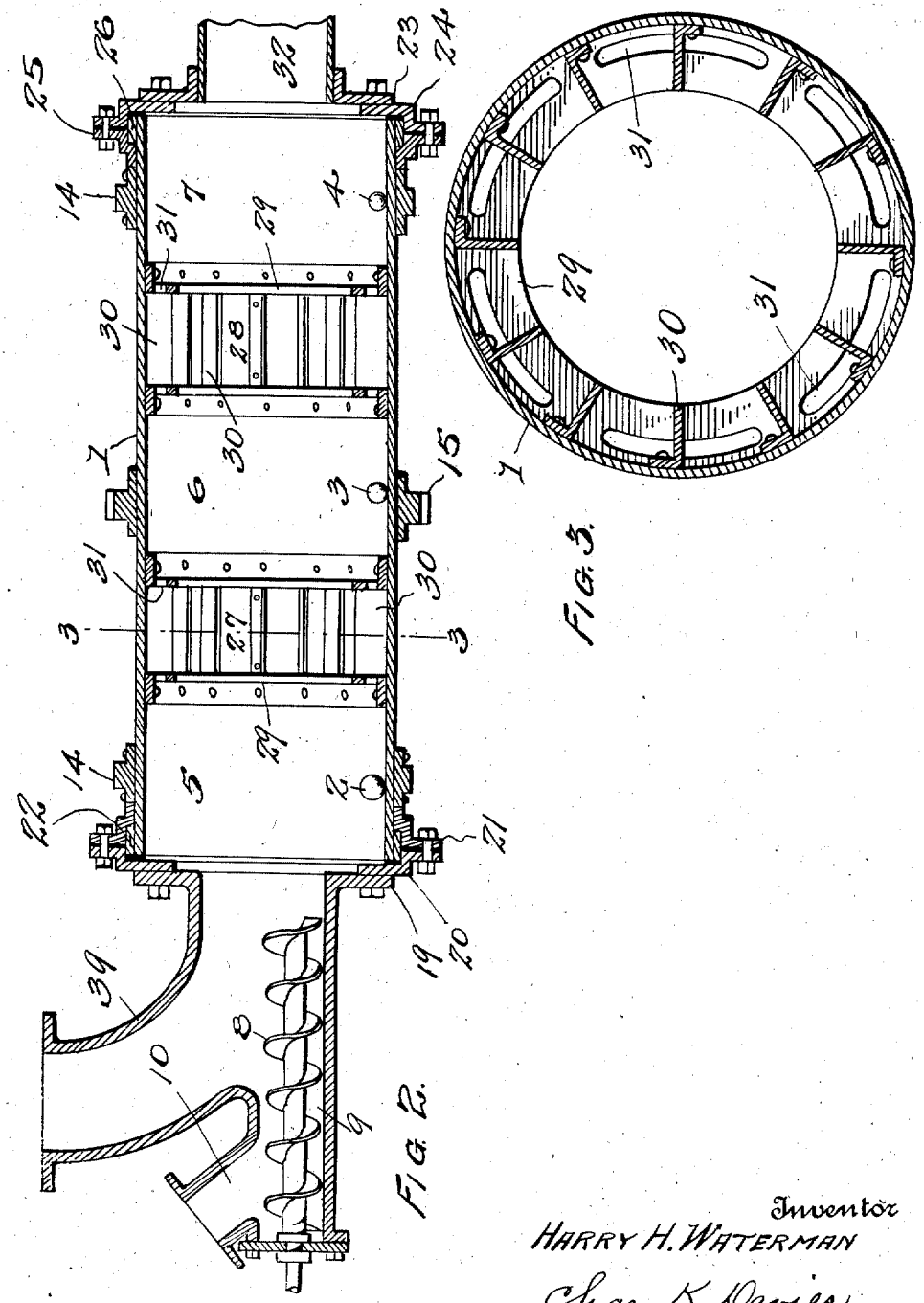
Inventor
HARRY H. WATERMAN
Chas. K. Davies
Attorney Reissued Oct. 15, 1929 Re. 17,462

UNITED STATES PATENT OFFICE

HARRY H. WATERMAN, OF STRASBURG JUNCTION, VIRGINIA

AIR-SWEPT BALL MILL

Original No. 1,630,992, dated May 31, 1927, Serial No. 752,133, filed November 25, 1924. Application for reissue filed August 28, 1929. Serial No. 389,769.

The present invention relates to that type of air swept ball mills adapted especially for reducing and separating materials to an impalpable dust or powder, as for instance in the production of dust or pulverized coal, lime, cement, from clinkers, etc., and the invention is adapted for use in many other connections in the arts and trades.

The invention involves the utilization of a system of pneumatic separation in connection with the reducing mill or ball mill, particularly applied for the purpose of reducing or pulverizing, and separating cement clinkers and pulverized coal. The impalpable dust or finished product of the mill is collected, stored in bins, or otherwise handled for future use in the arts and trades.

While I shall hereinafter refer to cement clinkers as the material treated, it will be understood that the apparatus of my invention is equally well adapted for reducing or pulverizing, separating, and collecting lighter or finer materials from phosphate rock and such other materials from which it is desired to separate the dust.

In connection with the air swept ball mill I utilize a continuous circulation of air currents for holding in suspension, separating, and collecting the comminuted material, and arrange a fan blower in the system for creating and maintaining this circulation, said fan blower being disposed in compact relation with the operating parts of the mill or separator. Means are provided in the air circulation system for regulating the velocity and pressure of air in the supply pipe relative to the capacity of the intake of the fan or blower, and this regulation is accomplished by means of variations in the sizes of pipes, and also by the assistance of an auxiliary collector within the system.

The invention consists in certain novel combinations and arrangements of parts involving the utilization of the air swept ball mill or reducing mechanism in combination with the air circulating system as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention. Before proceeding with the description in detail of my invention, it will be proper to say that in some or all respects my invention is applicable for various uses, and I therefore do not confine myself to the exemplification herein shown and described.

Figure 2 is an enlarged vertical longitudinal sectional view through the mill.

Figure 3 is an enlarged transverse sectional view at line 3—3 of Figure 2.

Figure 1:
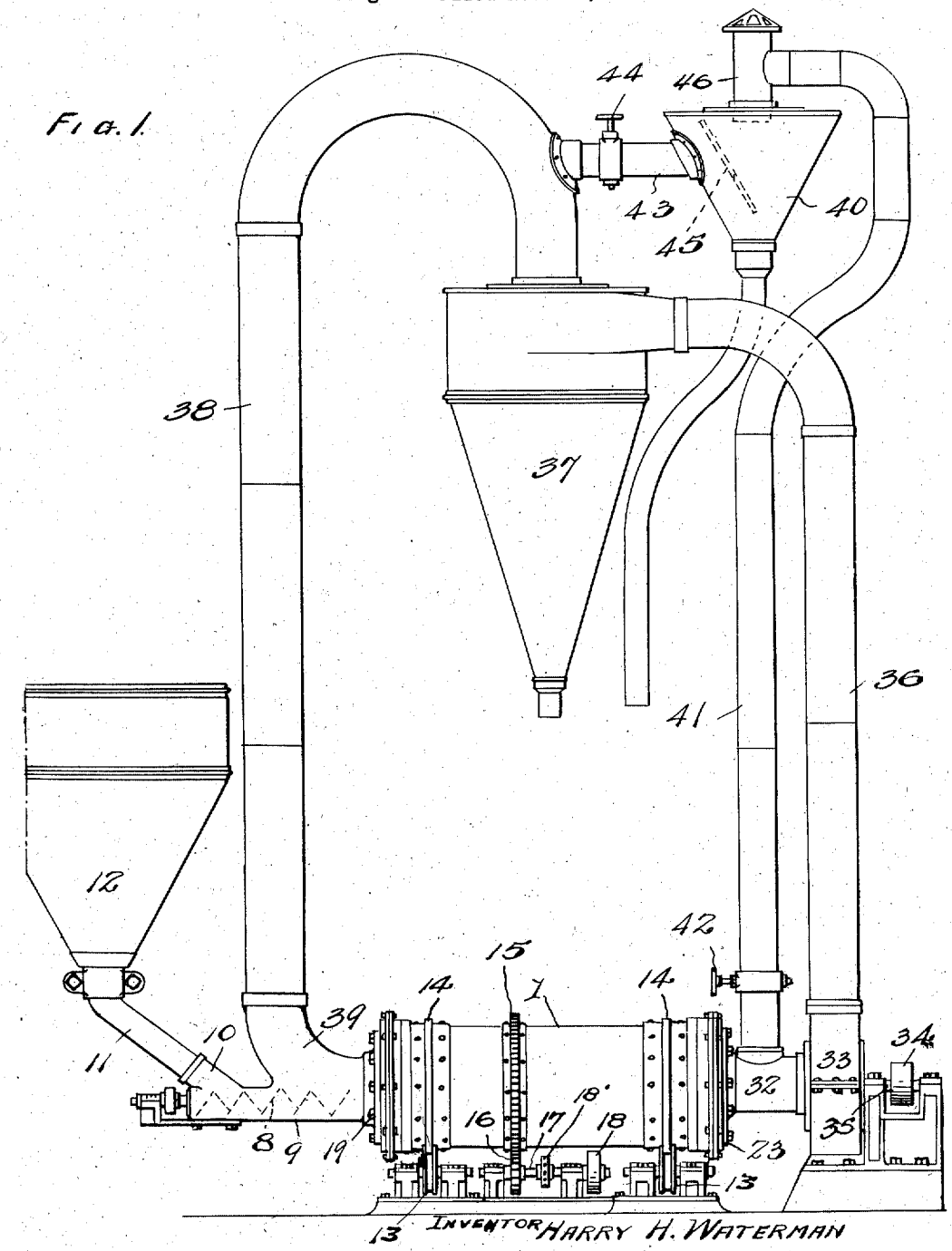
Figure 1 is a view in elevation showing an installation of my system for pulverizing, separating and collecting the reduced material.

In carrying out my invention I utilize a rotary drum or cylindrical casing 1 preferably fashioned of cast iron and equipped in such manner as to insure durability and satisfactory results whether used for light work or under severe conditions. The drum is designed for use with various sizes of balls or grinding mediums, the latter as indicated in Figure 2 being steel balls 2, 3 and 4 used in suitable numbers for grinding and pulverizing the material as it passes through the drum.

Three compartments (or a larger or smaller number) 5, 6, and 7 are provided within the drum, the coarsest material being supplied to the first compartment 5 and ground therein. The material is supplied to the drum by means of a conveyor, as a screw 8 located in a trough 9 at the bottom of the charging or feeding head 10 which receives the material by gravity through a feed pipe 11 from the feed hopper or bin 12, located and supported in suitable position for the purpose. The drum is supported to rotate upon its axis in usual manner as by pairs of supporting rollers 13 and annular tracks 14, and the drum may be equipped with any suitable operating mechanism as an exterior annular rack ring 15 and pinion 16 on shaft 17, and power is supplied to a driving pulley 18 on the shaft 17. A sprocket 18′ is indicated as part of mechanism for coupling the driving gearing.

The rotary drum is provided with closed substantially air tight and dust proof heads at the charging and discharging ends. In Figures 1 and 2 I have shown at the charging end of the drum a flange 19 which is bolted to a flanged, annular end plate 20 closing a portion of the drum at its charging end, and this end plate is bolted to a flanged clamping ring 21 which encircles the rotary drum and surrounds a retaining ring 22 fixed to and carried by the drum on its outer periphery.

At the discharge end of the drum an end flange 23 is bolted to the annular plate 24 and this end plate 24 is bolted to a clamp plate 25 which encircles and encloses the retaining ring 26 on the exterior of the drum. Suitable packing rings or gaskets are utilized at the proper places to insure dust proof and substantially air tight joints at the ends of the drum.

In addition to the pulverizing or grinding action which takes place in the several parts of the rotary drum due to the falling and impact of the several sets of balls in the mill, I utilize means for agitating and suspending the material being reduced within the drum, and for this purpose a number of intermediate compartments, here illustrated as two and designated as 27 and 28, are provided within the drum. An agitating compartment is interposed between adjoining grinding compartments, or a single agitating compartment may be utilized with a single grinding compartment in the drum. These compartments as 27 and 28 are each formed by the use of pairs of spaced annular rings 29 secured at the inner side of the drum wall in suitable manner. The rings are disposed transversely of the drum and project toward the center or axis thereof a distance sufficient to provide a substantial barrier or wall to prevent displacement of the grinding balls from their respective grinding compartments. Longitudinally extending blades or lifters 30 are spaced at proper intervals about the inside of the drum between the pairs of rings 29 for the purpose of agitating the material and causing the suspension of the comminuted material or dust.

To assist in the passage of the material from the feeding or charging end of the drum at the left in Figures 1 and 2, slots 31 are provided in the spaced rings 29. These slots are of a size to permit the rings to confine the grinding balls in their compartments, but the slots are of sufficient size to readily permit passage therethrough of the material being reduced, as lime for instance.

As before stated the coarser material is ground or pulverized by the action of the grinding balls or other grinding agencies as it enters the first compartment 5, and as the material successively passes through the compartments 6 and 7 it is successively reduced by the grinding action of the succeeding sets of balls 3 and 4. In the final grinding chamber 7 the material is pulverized or ground to an impalpable dust or desired fineness. During its progress through the drum the material, in addition to being reduced, is agitated, and in all of the compartments the finest dust is separated from the coarser material. After successive reductions, when the material reaches the final grinding compartment all the material in that compartment is reduced to the required fineness and the dust suspended within the drum. Due to this successive grinding and successive agitation imparted to the lime the entire charge of material fed to the drum is finely comminuted and suspended in the air swept mill for pneumatic separation which is continuously occurring in all parts of the drum.

In using the rotary drum, its peripheral speed, its size, the size and number of grinding and agitating compartments, and the sizes of the balls in the mill will be determined by the load carried and the character of the material to be reduced. While I have illustrated and referred to steel balls for the mill it will be apparent that other agencies may be utilized as grinding mediums depending upon the service required.

In the several grinding compartments the finer material is sifted from the coarser material in the respective compartments, not only by the agitating devices, but also by the falling and impact of the balls, and in this manner the coarser material in the respective compartments is separated from the finer material (which remains in suspension) thus rendering the coarser material more readily accessible to the grinding action of the balls in the respective compartments. As the impalpable dust is thus created in the several compartments it is continuously suspended in the drum and is subjected to the pneumatic action of the separator for conveying the dust from the drum.

The discharge end of the drum is provided with a pipe 32 which forms the intake for a fan or blower within the casing 33, said fan being operated by a belt passing over the fan pulley 34 on its shaft 35 in Figure 1.

The pipe 32 forms the central intake for the fan blower which may be of suitable type for the purpose, and the discharge pipe 36 of the fan blower extends, in this instance, upwardly to and has a tangential connection with the main dust collector 37 of the cyclone type. From the top of the main dust collector an air supply pipe 38 is shown extending downwardly, and this supply pipe is connected to the air inlet-head 39 at the feeding or charging end of the drum. It will be apparent that currents of air are caused to sweep through the drum from the inlet head 39 through the outlet pipe 32 which forms the intake for the fan blower, conveying dust from the feed conveyer or screw and then successively from the succeeding compartments in the drum, and thence the dust is impelled by action of the fan blower through pipe 36 to the collector 37 for deposit therein.

An auxiliary dust collector 40 is connected by a branch pipe 41 to the intake pipe 32 of the fan blower, and a valve or gate 42 in this pipe 41 controls and regulates the passage of air currents through pipe 41 to the fan blower.

By means of a pipe 43 the auxiliary dust collector is connected to the air supply pipe 38, and a gate or valve 44 controls passage of surplus air between the air supply pipe 38 and the dust collector 40 and pipe 41.

Within the auxiliary dust collector a baffle plate (or baffle plates) 45 are provided in the path of movement of air currents from the pipe 43 for separation of dust from the air. Thus any dust that may escape from the main collector may be diverted to the auxiliary collector and there separated from the air currents, or be returned to the intake of the blower. The surplus air from the auxiliary collector may escape through outlet pipe 46, to the atmosphere.

By this combination and arrangement of parts it will be apparent that the air supply is furnished from an intake located between the closed drum and the fan blower, and the supply is regulated by means of the valve or gate 42. As the intake pipe 41 has indirect communication with the discharge pipe 36 through the auxiliary collector and surplus air pipe 43 which is connected with the top of the main collector, the fan blower can draw air through the intake pipe 41 to reduce the velocity or pressure of air in the air supply pipe 38. By adjustment of the valve 44 in pipe 43 the decrease of pressure or velocity of air in the air supply pipe 38 may be regulated.

It will be noted that the drum has an unobstructed air swept interior through which the air currents pass by indirect exhaust of the fan blower for conveying the suspended dust from the drum. It will also be noted that the areas and capacity of the air supply pipe 38 and of the drum are materially greater than that of the discharge pipe 36 of the blower, thus providing means for decreasing the velocity of air currents between the main collector and the drum or mill, to insure expansion of air and permit the fan blower to fully consume the dust laden air. This expansion of air is also enhanced when the valve 44 is opened for use of the auxiliary collector 40. The baffle plates 45 of the auxiliary collector, it will be apparent, reduce the resistance of air coming from the pipe 43, and the dust separated from these air currents falls to the V-shaped settling chamber of the auxiliary collector.

Having thus fully described my invention, what I claim as new and desire to secure by Letters Patent is—

1. In an air swept mill of the ball type having a substantially unobstructed interior, a fan blower having its intake connected to one end of the mill, a dust collector connected to the exhaust of the fan blower, means for supplying material at one end of the mill, and an air supply pipe leading from the collector to the same end of the mill, whereby the material is conveyed to the intake of the fan by the velocity of the spent air supplied from the collector.

2. A ball mill having a substantially unobstructed air-swept interior, spaced compartments formed therein having alternating reducing and distributing means, a fan blower having its intake connected to one end of the mill, a discharge pipe and a collector, an air supply pipe connecting said collector and the other end of the mill, and means in connection with the air supply pipe for decreasing the velocity of air currents between the collector and the mill.

3. A ball mill having a substantially unobstructed air swept interior comprising spaced successive compartments having reducing means and intermediate compartments having distributers therein, a fan blower having its intake connected with one end of the mill, a dust collector connected with the discharge end of the blower, and an air supply pipe connecting said collector with the other end of the mill.

HARRY H. WATERMAN.